United States Patent

[11] 3,622,643

| [72] | Inventors | Guy DuCrest<br>Martigues;<br>Gerard Benaroya, Bois-Colombes; Francois<br>Laines, Martigues, all of France |
|---|---|---|
| [21] | Appl. No. | 730,609 |
| [22] | Filed | May 20, 1968 |
| [45] | Patented | Nov. 23, 1971 |
| [73] | Assignee | Produits Chimiquis Pechiney-Saint-Gobain<br>Paris, France |
| [32] | Priority | May 19, 1967 |
| [33] | | France |
| [31] | | 106972 |

[54] OXYCHLORINATION OF ETHYLENE AND VINYL CHLORIDE MIXTURES
15 Claims, No Drawings

[52] U.S. Cl. .................................................. 260/658 R,
260/659 A
[51] Int. Cl. .................................................. C07c 17/02,
C07c 17/04
[50] Field of Search .......................................... 260/658 R,
659

[56] References Cited
UNITED STATES PATENTS

| 3,184,515 | 5/1965 | Penner et al. ................ | 260/659 |
| 3,190,931 | 6/1965 | Laine et al. .................. | 260/659 |
| 3,420,901 | 1/1969 | Schulz .......................... | 260/659 |
| 3,427,359 | 2/1969 | Rectenwald et al. ......... | 260/659 |
| 3,461,086 | 8/1969 | Li ................................. | 260/659 |
| 3,468,968 | 9/1969 | Baker et al. .................. | 260/659 |

FOREIGN PATENTS

| 451,379 | 9/1948 | Canada ......................... | 260/658 |
| 992,847 | 5/1965 | Great Britain ............... | 260/659 |
| 1,417,810 | 10/1965 | France ......................... | 260/659 |

*Primary Examiner*—Bernard Helfin
*Assistant Examiner*—Joseph A. Boska
*Attorney*—McDougall, Hersh, Scott & Ladd ABSTRACT: A process for oxychlorination to produce a reaction product containing significant amounts of 1,1,2-trichloroethane and 1,1,2,2-tetrachloroethane in addition to 1,2-dichloroethane by oxychlorination of a mixture of ethylene and vinyl chloride with a fixed bed catalyst.

OXYCHLORINATION OF ETHYLENE AND VINYL CHLORIDE MIXTURES

This invention relates to a process for simultaneous preparation of 1,2-dichloroethane, 1,1,2-trichloroethane and 1,1,2,2-tetrachloroethane by oxychlorination of a mixture of ethylene and vinyl chloride in the presence of a fixed bed catalyst.

It is well known that oxychlorination of ethylene in the presence of an appropriate fixed bed catalyst will yield 1,2-dichloroethane. It is also known that oxychlorination can be used to provide other chlorinated compounds of ethane and of ethylene, such as dichloroethylenes, trichloroethylene, 1,1,2-trichloroethane and 1,1,2,2-tetrachloroethane. However, the prior art processes, especially those using catalysts in a single reaction zone, do not yield large amounts of $C_2$ saturated compounds which are more highly chlorinated than 1,2dichloroethane, without simultaneously providing side reactions, such as combustion, partial ethylene oxidation and/or dehydrochlorination which leads to $C_2$ unsaturated chlorinated compounds. In fact, in the warmest regions of the catalytic zone, which develop by reason of the exothermic reaction, the concentration in 1,2-dichloroethane is low and formation of 1,1,2-trichloroethane and 1,1,2,2-tetrachloroethane are practically nil because of the lack of 1,2-dichloroethane. Besides, in the zones immediately beyond the warmest regions, the concentration of the reagents, 1,2-dichloroethane, hydrochloric acid and oxygen is high but the temperature is relatively low and reaction to form 1,1,2-trichloroethane and 1,1,2,2-tetrachloroethane, which have high activation energies, develops at a slow rate.

Furthermore, the catalysts generally employed in oxychlorination of ethylene give rise to reactions which essentially yield 1,2-dichloroethane.

It is also known that the oxychlorination of vinyl chloride alone in a fixed bed catalyst gives essentially 1,1,2-trichloroethane. However, the total vinyl chloride conversion rate is relatively low, usually below 93 percent, and the amount of chlorinated ethylenic byproducts and combustion by products ($CO+CO_2$) is substantially at least 5 percent and often reaching 20 percent to 25 percent. In other respects the amount of 1,1,2-trichloroethane formed increases with the increase in residence time of vinyl chloride in the reactor. As a result, a significant total vinyl chloride conversion rate to 1,1,2-trichloroethane can be obtained only at the cost of productivity in such a process.

Unexpectedly, applicants have found that, when in a given apparatus under equal operating conditions, the oxychlorination reaction is carried out in a fixed bed with ethylene alone or with vinyl chloride alone, in both cases significantly less advantageous results are secured by comparison with the oxychlorination of ethylene and vinyl chloride in admixture. In fact, the oxychlorination of ethylene alone is very fast and leads to thermal profiles in the reactor, characterized by an abrupt rise in temperature to form hot spots followed by a rapid loss in temperature in the remainder of the reactor. In the case of oxychlorination of vinyl chloride alone, the reaction is slower and thus leads to less accentuated thermal profiles and avoidance of hot spots but to a spread of the warm region. While this does not give rise to hot spots, the highest temperature is markedly below that of the hot spot characterizing the oxychlorination reaction of ethylene.

Thus in the case of ethylene alone, the reaction proceeds at a high temperature but in a narrow zone of the fixed bed catalyst. As a result, the catalytic zone is not used throughout. In the case of vinyl chloride alone, the reaction proceeds in a more extended zone of catalyst but at a temperature markedly lower and which is inadequate for obtaining appropriate conversion rate.

On the other hand, when the oxychlorination reaction is carried out with ethylene and vinyl chloride mixtures, quite high maximal temperatures and quite and extended warm region are simultaneously obtained. The combination of both of these effects yields a significant improvement in the organic reagent conversion rates to $C_2$ saturated chlorinated products, while reducing side reactions such as the formation of ethylenic derivatives and combustion products while permitting operation at relatively high space velocities, above 250 $h^{-1}$.

This invention relates to a new and improved process for the oxychlorination of ethylene and vinyl chloride mixtures to produce $C_2$ saturated chlorinated compounds which, in addition to 1,2-dichlorethane, contain substantial proportions of 1,1,2-trichloroethane and 1,1,2,2-tetrachloroethane, and more particularly at least 15 molar percent and preferably 25 to 55 molar percent and up to 85 molar percent of the product. 1,1,2-trichloroethane and 1,1,2,2-tetrachloroethane represent products of considerable interest by themselves or as raw materials for the preparation of other chlorinated products.

This invention relates further to a new and improved catalytic system for use in the oxychlorination of mixtures of ethylene and vinyl chloride.

In accordance with the practice of this invention, a gas comprising molecular oxygen, hydrochloric acid and an ethylene-vinyl chloride mixture containing at least 20 molar percent but not more than 93 molar percent ethylene and not less than 7 molar percent but not more than 80 molar percent vinyl chloride, is passed through at least one catalytic reaction zone in the form of a fixed bed with the maximum temperature in the bed being within the range of 340° to 420° C.

In accordance with the preferred practice of this invention, the catalytic reaction zone through which the gaseous reactants are passed is subdivided into at least two zones which are independent one from the other, although they may be separated one from the other or superimposed or adjacent one to the other, but with the outlet from the first zone communicating with the inlet to the second zone for the passage of the gases successively through the zones but with the second zone operating under conditions differing from those of the first zone whereby the reactivity or the reaction rate in the second zone is greater than that of the first zone.

Such conditions can be achieved by modification of one or more of the conditions for the reaction, such as the nature of the catalyst, effective cross-sectional area of the zones, temperature, pressure, feed flow rate, or the amount of conversion of ethylene and vinyl chloride issuing from the first zone, or the molar ratios of the reactants making up the feed.

More specifically, one means for achieving the desired difference in behavior between the catalytic reaction zones resides in means for increasing the cross-sectional area of the second zone by comparison with the first, for this purpose both catalytic zones can be formed of one or more tubular members or multitubular devices in which the tubes forming the second catalytic zone have a total cross-sectional area greater than the cross-sectional area of the tubular members of the first zone of catalyst. In the preferred practice of this concept, it is desirable to make use of a ratio greater than 1 but not more than 3 between the diameters of the tubular members of the first zone as compared to the second zone with the second zone being the larger.

Another means for achieving the desired results resides in the utilization of a catalytic system in the second zone which provides for greater activity than the catalytic system in the first zone. For this purpose, the carrier on which the catalytic agent is deposited can be selected to have a smaller average surface area in the first zone by comparison with the average surface area in the carrier of the second zone. For example, the catalyst in the first zone can be in the form of a catalytic agent deposited on a carrier having an average surface area less than 3 m.²/g. in a distribution of diameter of pores of from 0.05 to 10 microns, while the catalyst in the second reaction zone is formed of the same or different catalytic agent deposited on a carrier having an average specific surface area at least 10 percent greater than the average surface area of the carrier in the first zone, but generally not exceeding 10 m.²/g. with a distribution of diameter of pores also within the range of 0.05 to 10 microns.

The term "average specific surface" is used because of the fact that, if a series of samples of catalyst are taken from different parts of the catalytic bed in order to determine the carrier specific surface by the B.E.T. method, it will be found that the extreme values will not deviate more than 100 percent from the average.

Generally, the particle size of the carrier will be within the range of 1 to 15 mm. When the tube diameter of the first and second catalytic reaction zones have similar cross-sectional areas, it may be beneficial to make use of a granular size for the catalyst which will be lower in the second zone than in the first but preferably not below 1 mm.

Temperature is another parameter which can be used effectively to achieve the desired differences in reaction rates in the described reaction zones. To achieve the conditions desired for variation in the reaction rates between the zones, it is desirable to maintain a reaction temperature in the second catalytic reaction zone which is higher than the reaction temperature in the first catalytic reaction zone, with the preferred differential being a maximum temperature in the second catalytic reaction zone which is 5° to 50° C. higher than the maximum temperature in the first catalytic reaction zone. In the practice of this concept of the invention, the ethylene, vinyl chloride, hydrochloric acid and oxygen-containing gas are passed through the first catalytic zone at a temperature which gives a maximal temperature within the range of 34.° to 400° C. and preferably 350° to 38.° C. and the effluent from the first reaction zone is introduced into the second catalytic reaction zone for reaction at a maximal temperature within the range of 345° to 420° C. and preferably 355° to 385° C., but with the region of highest temperature in the second zone controlled to be about 5° to 50° C. above the region of highest temperature in the first reaction zone.

A number of advantages are derived from operation of the described oxychlorination process at positive pressures within the range of 1 to 10 absolute bars and preferably 1.1 to 5 absolute bars. Although pressures above 10 absolute bars can be used, the apparatus permitting, no marked advantage is derived from operation under such higher pressures. In the preferred practice of this invention, the second catalytic reaction zone is operated at a pressure above atmospheric pressure since said positive pressures favor the formation of 1,1,2-trichloroethane and 1,1,2,2-tetrachloroethane. When other parameters are used for achieving the desired differential reaction rates, substantial equal pressures can be employed in the two reaction zones.

For the practice of the invention to maximize the yield of 1,1,2-trichloroethane, 1,1,2,2-tetrachloroethane and pentachloroethane in the reaction product without excessive side reactions of the types described, the feed ratios of the reactants should be maintained within the following parameters, hereinafter specified as molar feed ratios: $C_2H_3Cl/(C_2H_4+C_2H_3Cl)$ within the range of 0.07 to 0.8 and preferably 0.10 to 0.60; $HCl/(C_2H_4+C_2H_3Cl)$ within the range of 2.0 to 3.0 and preferably within the range of 2.15 to 2.5, and $O_2/(C_2H_4+C_2H_3Cl)$ within the range of 0.6 to 1.5 and preferably 0.65 to 0.90. The feed flow rate, based upon the mixture of ethylene and vinyl chloride, should be within the range of 2 to 12 moles per hour per liter of catalyst and preferably less than 9 moles per hour per liter of catalyst.

As the carrier for the catalytic agent, use can be made of one or more substances, amongst others, such as silica silicates, clays, alimino-silicates, magnesia, graphite, and preferably alumina. The above list is given by way of illustration and not by way of limitation. Very good results are obtained with a carrier of alumina having an average specific surface below 1 m.²/g. in the first catalytic reaction zone and an average specific surface below 4 m.²/g. in the second catalytic zone.

The catalytic agent can be identical or different in both successive catalytic zones. Catalytic agents which can be used are essentially made up of at least one compound of the following list of elements, namely: alkali metals, alkaline earth metals, bismuth, cadmium, chromium, cobalt, copper, tin, iron, magnesium, manganese, nickel, platinum, rare earths, thorium, vanadium, zinc and zirconium.

The following examples are given by way of illustration, but not by way of limitation of the practice of this invention:

EXAMPLE I

A catalyst composed of alumina balls having a diameter within the range of 4 to 7 mm. with an average specific surface of 0.6 m.²/g. in pores of from 0.5 to 10 microns and impregnated with 3 percent by weight copper in the form of $CuCl_2 \cdot 2 H_2O$ and 1.5 percent by weight potassium in the form of KCl is loaded to fill a length of 50 cm. into a first reaction zone formed of a tubular reactor of Inconel 600 having a diameter of 27 mm. and a length of 1000 mm.

The first reaction zone is fed with a gaseous mixture of ethylene and vinyl chloride, hydrochloric acid and air in which the total flow rate of ethylene and vinyl chloride mixture is 3.5 moles per hour per liter of catalyst. The space velocity is 485 $h^{-1}$ and the pressure at the reactor inlet is 1.1 absolute bar.

The feed molar ratios of reactants introduced have the following value:

$O_2/(C_2H_4+C_2H_3Cl)=0.87$
$C_2H_3Cl/(C_2H_4+C_2H_3Cl)=B0.50$
$HCl/(C_2H_4+C_2H_3Cl)=2.30$

The reaction zone, which is double-jacketed for the circulation of a heat exchange fluid, is heated to starting reaction temperature. The respective temperatures of the warmest region in the catalytic reaction zone and in the double jacket, under normal operating conditions, are 355° to 365° C. and 280° C., respectively.

Under these conditions, the product issuing from the reaction zone gives the following results:

| | |
|---|---|
| total conversion rate of ethylene | 96.9% |
| total conversion rate of vinyl chloride | 96.4% |

The amounts of 1,2-dichloroethane, 1,1,2-trichloroethane, 1,1,2,2-tetrachloroethane and pentachloroethane and expressed in molar percent based upon the mixture of ethylene and vinyl chloride involved, are respectively 42.2, 47.5, 3.2 and 0.5.

The conversion rate of the mixture of ethylene and vinyl chloride in combustion products $(CO+CO_2)$ remains below 0.3 percent.

The ratio $100 (Xb+Xc)/(Xa+Xb+Xc)$ is equal to 54.6, in which:

Xa represents the conversion rate of
   the ethylene and vinyl chloride mixture: into 1,2 - dichloroethane

Xb represents the conversion rate of
   the ethylene and vinyl chloride mixture: into 1,1,2-trichloroethane Xc represents the conversion rate of
   the ethylene and vinyl chloride mixture: into 1,1,2,2-tetrachloroethane.

By way of comparison and to better illustrate the value of the process of this invention two tests (a) and (b) were carried out with the same reactor under the same temperature conditions and with the same molar ratios of oxygen and hydrochloric acid to the organic reagents, but by using in test (a) ethylene alone and in test (b) vinyl chloride alone as the organic reagents.

The following results are obtained:

| | Total conversion rate of— | | Conversion rate in— | | | |
|---|---|---|---|---|---|---|
| | $C_2H_4$ | $C_2H_3Cl$ | 1,2-di-chloro-ethane | 1,1,2-tri-chloro-ethane | 1,1,2,2-tetra-chloro-ethane | Penta-chloro-ethane |
| Test (a) | 79.7 | | 72.2 | 3.1 | 0.6 | Traces |
| Test (b) | | 74.3 | | 69.9 | 1.5 | 0.2 |

By taking this experimental data as a basis, the results obtained, calculated to 100 moles organic reagents, make up of 50 moles $C_2H_4$ and 50 moles $C_2H_3Cl$ used alone, are far below the results obtained by the reaction with the mixture of 100 moles of which 50 moles are $C_2H_4$ and 50 moles are $C_2H_3Cl$ in accordance with the practice of this invention.

The comparative table is set forth as follows:

|  | Total conversion rate of— | | Conversion rate in— | | | |
| --- | --- | --- | --- | --- | --- | --- |
|  | $C_2H_4$ | $C_2H_3Cl$ | $X_a$ | $X_b$ | $X_c$ | $X_d$ |
| Reaction with 100 moles of mixture by the process according to the invention (50% $C_2H_4$) and 50% ($C_2H_3Cl$) | 96.9 | 96.4 | 42.2 | 47.5 | 3.2 | 0.5 |
| Separated reactions with 50 moles $C_2H_4$ and with 50 moles $C_2H_3Cl$ | 79.7 | 74.3 | 36.1 | 36.5 | 1.1 | 0.1 |

The ratios $100(X_b+X_c)/(X_a+X_b+X_c)$ are respectively 54.6 for the process of the invention and 51.0 for the cumulative tests (a) and (b).

EXAMPLE II 2.51 liters catalyst composed of a carrier of alumina balls having a diameter within the range of 3 to 5 mm. and an average specific surface of 1 m.$^2$/g. in pores from 0.2 to 8 microns, impregnated with 5 percent by weight copper in the form of $CuCl_2 \cdot 2H_2O$ and 3 percent by weight potassium in the form of KCl are loaded into a first reaction zone in the form of a nickel tubular reactor having a diameter of 32 mm. and a length of 3700 mm.

A second reaction zone is make up of a nickel tubular reactor having a diameter of 62 mm. filled for a length of 3500 mm. with alumina balls having a diameter within the range of 3 to 5 mm. and an average specific surface of 2 m.$^2$/g. in pores from 0.1 to 1 micron, and impregnated with 5 percent by weight copper in the form of $CuCl_2 \cdot 2H_2O$ and 3 percent by weight potassium in the form of KCl.

Both tubular reactors, connected in series, are fed with a gaseous mixture of ethylene and vinyl chloride, hydrochloric acid and air. The total flow rate based upon ethylene and vinyl chloride is 2.3 moles per hour per liter of catalyst. The pressure at the first reactor inlet is 1.7 absolute bars and at the second reactor inlet is 1.3 absolute bars.

The porportions of ethylene and vinyl chloride in the feed are given below. The amount of vinyl chloride introduced into the reaction medium, based on the entire amount of organic reagents ($C_2H_4+C_2H_3Cl$) is measured by the ratio
$r=100(C_2H_3Cl)/(C_2H_3Cl+C_2H_4)$
The feed molar ratios of reagents have the following values:
$O_2/(C_2H_4+C_2H_3Cl)=0.65$
$HCl/(C_2H_4+C_2H_3Cl)=2.30$ Both reactors, which are double-jacketed for circulation of heat exchange fluid, are heated up to start the reaction. The double jacket temperature of the first reactor is maintained at 290° C. and that of the second reactor is maintained at 300° C. The temperature of the warmest region (maximal temperature) in the first reactor is 345° to 355° C. while the temperature of the warmest region (maximal temperature) in the second reactor is 360° to 375° C.

The following are the results obtained:

1. $r=12\%$

At the exit of the first reaction zone:

| | | % |
| --- | --- | --- |
| total conversion rate of ethylene and of vinyl chloride | | 69 |
| conversion rate of ethylene and of vinyl chloride in 1,2-dichloroethane | X | 61.9 |
| conversion rate of ethylene and of vinyl chloride in 1,1,2-trichloroethane | Y | 5.0 |
| conversion rate of ethylene and of vinyl chloride in 1,1,2,2-tetrachloroethane | Z | 1.0 |
| conversion rate of ethylene and of vinyl chloride in various organic products | | 1.0 |
| conversion rate of ethylene and of vinyl chloride in combustion products ($CO+CO_2$) | | 0.1 |

The yield of 1,2-dichloroethane, 1,1,2-trichloroethane and 1,1,2,2-tetrachloroethane is 67.9 percent based on the ethylene and vinyl chloride involved.

The proportion $100(Y+Z)/(X+Y+Z)$ is equal to 8.8.

At the exit of the second reaction zone:

| | | % |
| --- | --- | --- |
| total conversion rate of ethylene and of vinyl chloride | | 98.7 |
| total conversion rate of hydrochloric acid | | 92.7 |
| conversion rate of ethylene and of vinyl chloride in 1,2-dichloroethane | Xa | 67.7 |
| conversion rate of ethylene and of vinyl chloride in 1,1,2-trichloroethane | Xb | 22.1 |
| conversion rate of ethylene and of vinyl chloride in 1,1,2,2-tetrachloroethane | Xc | 3.5 |
| conversion rate of ethylene and of vinyl chloride in various organic products | | 3.6 |
| conversion rate of ethylene and of vinyl chloride in combustion products ($CO+CO_2$) | | 0.8 |

The yield of 1,2-dichloroethane, 1,1,2-trichloroethane and 1,1,2,2-tetrachloroethane is 93.3 percent based on the ethylene and vinyl chloride involved.

The ratio $100(Xb+Xc)/(Xa+Xb+Xc)$ is equal to 27.

2. The same test was repeated but with $r=21$ percent and with out modification of the temperatures of the zones.

The following results are obtained at the exit of the second reaction zone:

| | | % |
| --- | --- | --- |
| total conversion rate of ethylene and of vinyl chloride | | 98.4 |
| total conversion rate of hydrochloric acid | | 96.8 |
| conversion rate of ethylene and of vinyl chloride in 1,2-dichloroethane | Xa | 50.7 |
| conversion rate of ethylene and of vinyl chloride in 1,1,2-trichloroethane | Xb | 39.6 |
| conversion rate of ethylene and of vinyl chloride in 1,1,2,2-tetrachloroethane | Xc | 5.1 |
| conversion rate of ethylene and of vinyl chloride in various organic products | | 3.5 |
| conversion rate of ethylene and of vinyl chloride in combustion products ($CO+CO_2$) | | 0.5 |

The yield of 1,2 dichloroethane, 1,1,2-trichloroethane and 1,1,2,2-tetrachloroethane is 94.4 percent based upon the ethylene and vinyl chloride involved.

The proportion $100(Xb+Xc)/(Xa+Xb+Xc)$ is equal to 47.

EXAMPLE III

A first reaction zone, make up of a nest of 30 steel tubes having an inside diameter of 30 mm. and a length of 4 m., are connected in series with a second reaction zone composed of another nest of 13 steel tubes having an inside diameter of 50 mm.

The reaction zones are filled with a catalyst make up of alumina balls having a diameter within the range of 4 to 7 mm. with an average specific surface of 0.6 m.$^2$/g. in pores from 0.5 to 10 microns and impregnated with 5.9 percent by weight copper in the form of $CuCl_2 \cdot 2 H_2O$ and with 4.4 percent by weight potassium in the form of KCl. The total filling volume is 164 liters.

At the inlet of the first nest of tubes, a gaseous mixture of ethylene and vinyl chloride, hydrochloric acid and air is introduced. The total flow rate of the ethylene and vinyl chloride mixture is 3.3 moles per hour per liter of catalyst. The feed molar ratios of reactants have the following values:
$O_2/(C_2H_4+C_2H_3Cl)=0.75$
$HCl/(C_2H_4+C_2H_3Cl)=2.19$
$C_2H_3Cl/(C_2H_4+C_2H_3Cl)=B0.40$ The pressure of reactants at the inlet of the first nest of tubes is 1.7 absolute bar and that at the inlet of the second nest of tubes is 1.5 absolute bar.

Both systems of nest of tubes each have a double jacket through which a heat exchange fluid can be circulated. The temperature of the double jacket in the first reactor is 285° C. and that maintained in the double jacket of the second reactor is 300° C. The maximal temperature of the first nest of tubes is 350° to 360° C. while the maximal temperature of the second nest of tubes is 365° to 375° C.

Under these conditions, the following results are obtained:

|  | % |
|---|---|
| total conversion rate of ethylene | 97 |
| total conversion rate of hydrochloric acid | 91 |
| total conversion rate of vinyl chloride | 95.6 |

The molar composition of the mixture of chlorinated products issuing from the second nest of tubes is as follows:

|  |  | % |
|---|---|---|
| 1,2-dichloroethane | Xa | 53.0 |
| 1,1,2-trichloroethane | Xb | 37.1 |
| 1,1,2,2-tetrachloroethane | Xc | 7.0 |
| various chlorinated derivatives in $C_2$ |  | 2.9 |

The conversion rate of ethylene and vinyl chloride in combustion products ($CO+CO_2$) is 1.8 percent.

The ratio $100(Xb+Xc)/(Xa+Xb+Xc)$ is 45.4.

It will be apparent from the foregoing that we have provided a new and improved process for oxychlorination of ethylene and vinyl chloride in admixture to produce a product containing substantial amounts of 1,1,2-trichloroethane and 1,1,2,2-tetrachloroethane as well as pentachloroethane in addition to 1,2-dichloroethane.

It will be understood that changes may be made in the details of formulation and operation without departing from the spirit of the invention, especially as defined in the following claims.

We claim:

1. A process for oxychlorination of a mixture of ethylene and vinyl chloride to produce a reaction product containing 1,1,2-trichloroethane and 1,1,2,2-tetrachloroethane comprising the steps of passing through a catalytic reaction zone containing a fixed bed catalyst consisting essentially of an oxychlorination catalyst on a carrier having a specific surface area not greater than 10 m.²/g., a mixture of a molecular oxygen-containing gas, hydrochloric acid and an organic feed mixture of ethylene and vinyl chloride in which the ethylene and vinyl chloride are present in the ratio of 20–93 molar percent ethylene and 80 to 7 molar percent vinyl chloride based upon the total mixture and the ratio of HCl to ethylene and vinyl chloride is within the range of 2.0–3.0 and the molar ratio of oxygen to ethylene and vinyl chloride is within the range of the 0.6–1.5, at a temperature within the range of 340° to 420° C.

2. The process as claimed in claim 1 in which the ethylene and vinyl chloride are present in the feed ratio of 40 to 90 molar percent ethylene to 60 to 10 molar percent vinyl chloride.

3. The process as claimed in claim 1 in which the gaseous reactants are passed through the catalytic reaction zone at a feed ratio based upon ethylene and vinyl chloride of 2 to 12 moles per hour per liter of catalyst.

4. The process as claimed in claim 1 in which the gaseous reactants are passed through the catalytic reaction zone at a feed ratio based upon ethylene and vinyl chloride of 2 to 9 moles per hour per liter of catalyst.

5. The process as claimed in claim 1 in which the molar feed ratio of $HCl/(C_2H_4C_2H_3Cl)$ is within the range of 2.15 to 2.50.

6. The process as claimed in claim 1 in which the molar feed ratio of $O_2/(C_2H_4+C_2H_3Cl)$ is within the range of 0.65 to 0.9.

7. The process as claimed in claim 1 in which the gaseous reactants are introduced into the catalytic reaction zone at a pressure within the range of 1 to 10 bars.

8. The process as claimed in claim 1 in which the gaseous reactants are introduced into the catalytic reaction zone at a pressure within the range of 1.1 to 5 bars.

9. The process as claimed in claim 1 in which the catalytic reaction zone is subdivided into first and second catalytic reaction zones through which the gaseous reactants are successively passed.

10. The process as claimed in claim 9 in which the maximal temperature in the second catalytic reaction zone is 5° to 50° higher than the maximal temperature in the first catalytic reaction zone.

11. The process as claimed in claim 9 in which the first catalytic zone is operated at a maximal temperature within the range of 340° to 400° C. and the second catalytic reaction zone is operated at a maximal temperature within the range of 345° to 420° C., with the maximal temperature in the second catalytic reaction zone being 5° to 50° higher than the maximal temperature in the first catalytic reaction zone.

12. The process as claimed in claim 9 in which the first catalytic zone is operated at a maximal temperature within the range of 350° to 380° C. and the second catalytic reaction zone is operated at a maximum temperature within the range of 355° to 385° C., with the maximal temperature in the second catalytic reaction zone being 5° to 50° C. higher than the maximal temperature in the first catalytic reaction zone.

13. A process as claimed in claim 9 wherein both of said reaction zones are formed of one or more tubular zones, with the tubular zones in said second reaction zone having a greater cross-sectional area than the tubular zone in said first reaction zone.

14. A process as claimed in claim 9 wherein the catalyst carrier in the second reaction zone has a specific surface area at least 10 percent greater than the specific surface area of the carrier in the first reaction zone.

15. The process as claimed in claim 13 which the diameter of the tubular members of the second catalytic reaction zone is one to three times the diameter of the tubular members of the first catalytic reaction zone.

* * * * *

UNITED STATES PATENT OFFICE
CERTIFICATE OF CORRECTION

Patent No. 3,622,643　　　　　　　Dated November 23, 1971

Inventor(s) Guy DuCrest et al.

It is certified that error appears in the above-identified patent and that said Letters Patent are hereby corrected as shown below:

column 4, line 71, $C_3H_4$ should be $C_2H_4$;

" " $C_3H_3CL$ should be $C_2H_3Cl$ column 5, line 10, $C_3H_4$ should be $C_2H_4$;

" " $C_3H_3Cl$ should be $C_2H_3Cl$ line 17, $C_3H_4Cl$ should be $C_2H_3Cl$

Column 5, line 16, "C] $H_4$" should read -- $C_2H_4$ --.

Signed and sealed this 16th day of May 1972.

(SEAL)
Attest:

EDWARD M. FLETCHER, JR.　　　　　ROBERT GOTTSCHALK
Attesting Officer　　　　　　　　Commissioner of Patents